United States Patent [19]

Bock

[11] Patent Number: 5,082,416
[45] Date of Patent: Jan. 21, 1992

[54] METHOD OF PICKING UP AND DEPOSITING A HOLLOW RECEPTACLE SUCH AS A BIN, CONTAINER OR THE LIKE BY AND ON, RESPECTIVELY, A VEHICLE WITH CHANGE GEAR MECHANISM; CHANGE GEAR MECHANISM FOR CARRYING OUT THE METHOD; AND RECEPTACLE DESIGNED FOR USE IN SUCH METHOD

[75] Inventor: Normann Bock, Syke-Barrien, Fed. Rep. of Germany

[73] Assignee: Edelhoff M.S.T.S. GmbH, Iserlohn, Fed. Rep. of Germany

[21] Appl. No.: 574,535

[22] Filed: Aug. 24, 1990

Related U.S. Application Data

[63] Continuation-in-part of Ser. No. 221,254, filed as PCT DE87/00472, Oct. 21, 1987, abandoned.

[30] Foreign Application Priority Data

Oct. 23, 1986 [DE] Fed. Rep. of Germany ....... 3636037

[51] Int. Cl.$^5$ .......................... B60P 1/64; B65G 65/23
[52] U.S. Cl. .................... 414/492; 414/786; 414/919
[58] Field of Search ............... 414/786, 332, 477–479, 414/491, 492, 498, 546, 555, 919

[56] References Cited

U.S. PATENT DOCUMENTS

| | | | |
|---|---|---|---|
| 2,606,676 | 8/1952 | Dempster | 414/919 X |
| 3,272,546 | 9/1966 | Cooley | 414/491 X |
| 3,355,043 | 11/1967 | Talbert | 414/332 X |
| 3,643,824 | 2/1972 | Partridge | 414/492 |
| 3,812,988 | 5/1974 | Pyle | 414/477 |
| 3,819,075 | 6/1974 | Derain | 414/491 |
| 3,892,323 | 7/1975 | Corompt | 414/491 |
| 4,091,946 | 5/1978 | Kraeft et al. | 414/555 X |
| 4,626,166 | 12/1986 | Jolly | 414/919 X |
| 4,634,335 | 1/1987 | van den Pol | 414/919 X |
| 4,715,767 | 12/1987 | Edelhoff et al. | 414/477 X |
| 4,840,532 | 6/1989 | Galbreath | 414/479 |

FOREIGN PATENT DOCUMENTS

| | | |
|---|---|---|
| 8019121 | 2/1982 | Fed. Rep. of Germany . |
| 3312508 | 10/1984 | Fed. Rep. of Germany ...... 414/919 |
| 3329412 | 2/1985 | Fed. Rep. of Germany ...... 414/919 |
| 3416643 | 11/1985 | Fed. Rep. of Germany ...... 414/919 |
| 3610263 | 10/1986 | Fed. Rep. of Germany ...... 414/919 |
| 60045 | 4/1985 | Japan ...................... 414/498 |

*Primary Examiner*—David A. Bucci
*Attorney, Agent, or Firm*—Collard, Roe & Galgano

[57] ABSTRACT

For picking up and depositing a hollow receptacle such as a bin, container or the like by/on a vehicle with a change gear mechanism having a tilting frame pivoted in the back on the undercarriage of the vehicle and movable by a tilting cylinder supported on the undercarriage, and furthermore having a coulisse displaceable on the tilting frame by associated actuating elements and equipped with a stop element capable of being engaged with the associated fitting on the receptacle, the coulisse, for depositing the receptacle, is first retracted until the rear end of the receptacle projects beyond the back of the vehicle by a predetermined measure. Subsequently, the tilting frame is utilized until the lower zone on the rear end of the receptacle rests on the surface of the roadway. Thereafter, the actuating elements of the coulisse are switched to idle run, and subsequently, with the brakes of the vehicle released, if need be, the tilting frame is tilted further until the receptacle is standing upright on its rear end and the stop element and the fitting can be disengaged. For picking up the receptacle, the above operation takes place in the reversed sequence.

13 Claims, 8 Drawing Sheets

METHOD OF PICKING UP AND DEPOSITING A HOLLOW RECEPTACLE SUCH AS A BIN, CONTAINER OR THE LIKE BY AND ON, RESPECTIVELY, A VEHICLE WITH CHANGE GEAR MECHANISM; CHANGE GEAR MECHANISM FOR CARRYING OUT THE METHOD; AND RECEPTACLE DESIGNED FOR USE IN SUCH METHOD

This is a continuation-in-part of copending application Ser. No. 07/221,254, filed as PCT/DE87/00472, Oct. 21, 1987, now abandoned.

BACKGROUND OF THE INVENTION

1. Field of the Invention

The invention relates to a method for picking up and depositing a hollow receptacle such as a bin, container or the like by and on, respectively, a vehicle equipped with a change gear mechanism having a tilting frame, which is pivoted at the back of the undercarriage of the vehicle and movable by means of a tilting cylinder supported on the undercarriage, and which has a coulisse displaceable on the tilting frame by means of associated actuating elements, such coulisse being equipped with a stop element capable of being engaged in the associated fitting on the receptacle.

2. Prior Art

Vehicles equipped with a change gear mechanism are special vehicles capable of picking up or depositing and transporting empty or filled change receptacles. In particular bins are placed in an upright or vertical position. However, they have to be transported in a lying position when moved with the vehicle to and from the location in which they are placed. Thus the pick-up and depositing of such bins requires change gear mechanisms capable of changing a receptacle to be set up, in particular a bin, from its lying position to the upright or vertical position. This operation requires special constructional measures enabling both the vehicle and the change gear mechanism to safely negotiate also the substantial weights of filled receptacles, in particular bins, while the latter are being picked up or deposited. For this reason, vehicles with change gear mechanisms are equipped especially within the zone in the back of the vehicle with supports capable of being extended or folded outwardly or made ready for operation in some other way, which supports, prior to the pick-up or depositing operation, are moved into a supporting position in which they support the vehicle on the ground or surface of the roadway. This entails the drawback that the supports signify a relatively high loss in payload and, furthermore, that the stability of the vehicle is problematic, for example in that a supporting leg may give way and sink into the ground under unfavorable ground conditions.

Furthermore, picking up and depositing heavy receptacles, in particular bins, is made difficult by the fact that the operation of the change gear mechanism requires simultaneous controlling of the tilting motion of the tilting frame and of the displacement motion of the coulisse of the tilting frame. Such controls are carried out by hand, as each receptacle or bin needs to be operated or negotiated in a way adapted to its specific type of construction or its dimensions. This means that the safety in picking up and depositing receptacles, in particular bins, is highly dependent upon the care and skill of the person operating the change gear or the vehicle equipped with such change gear.

SUMMARY OF THE INVENTION

The invention is based on the problem of facilitating the pick-up and depositing of a receptacle, in particular a bin, by and on a vehicle equipped with a change gear mechanism.

According to the invention, this problem is resolved by a method in which for the depositing of the receptacle, the coulisse is retracted until the rear end of the receptacle projects by a predetermined measure beyond the back of the vehicle, whereupon the tilting frame is slightly tilted until the lower part of the rear end of the receptacle rests on the surface of the roadway, the actuating elements of the coulisse are switched to idle motion, and the tilting frame is subsequently tilted further, if necessary with the brakes of the vehicle released, until the receptacle is standing upright on its rear end and the stop element and the fitting can be disengaged.

In the method of the invention, the receptacle, in particular a bin which has been transported on the change gear mechanism of the vehicle in its lying position, is first pushed rearwardly into a certain position by controlled displacement of the coulisse, preferably to an extent such that after the tilting frame has been set to about 45°, the end of the receptacle, bin or container is forced against the ground. This causes the weight of the receptacle to be shifted to the rear end of the latter, and the receptacle is stabilized by resting on the surface of the roadway or ground, with the ensuing advantage that the payload of the vehicle is increased correspondingly.

As soon as the receptacle has reached this partly supporting position, the actuating element of the coulisse is switched to idle run, with the significant advantage that the tilting frame can be steplessly tilted in this way in one continuous tilting operation until in the vertical line. During tilting into the vertical line, the coulisse remains connected with the bin, so that because of its idle run, it is capable of sliding out further, or it is extended automatically. As soon as the receptacle or the bin has been brought into the vertical position with the help of the tilting frame and is safely put into place in its location on the ground, the stop element can be released from the fitting of the container or bin.

The operational sequence described above takes place in the reversed order for picking up an upright container: The vehicle drives close to the standing bin, swivels its tilting frame into the vertical line, and extends the coulisse of the tilting frame until the stop element can be engaged with the fitting of the bin. As soon as the stop element has engaged the fitting of the receptacle, the actuating element of the coulisse is again switched to idle run, and the pick-up operation can take its course while the tilting frame is tilting inwardly until the receptacle has reached again the approximately 45°-position, whereupon it is finally placed on the vehicle.

Both during pick-up and depositing operations, the receptacle or bin swivel around the points of support with which its rear end supports itself on the surface of the roadway or ground. This support position is reached, as described before, when the tilting frame is in a position of tilt of about 45°. However, said support position may have been reached or assumed also in positions of tilt greater or smaller than 45°. Within the swivel range between the upright position and said position of about 45°, the brakes of the vehicle equipped with the change gear mechanism have to be released in order to permit the axis of swivel, around which the tilting frame is moving, to follow during its tilting motion the forced guidance in a circular path around the point of support of the bin on the ground, by having the vehicle performing a rolling motion on the surface of the roadway or ground.

For picking up a standing container, the method of the invention is developed further with a special benefit in that following the engagement or locking of the stop element in the fitting of the container, the rear of the vehicle is lifted by a predetermined measure on the standing container. Such lifting of the rear part of the vehicle can be accomplished, for example by shortening the length of the tilting frame and retracting the coulisse into the tilting frame correspondingly, using its actuating elements. For example, the rear part of the vehicle may be lifted until the rear wheels of the vehicle are clear of the ground. This measure of lifting the rear part of the vehicle has the advantage that the weight of the vehicle is fully engaged as a counterweight via the tilting hydraulics, which means that even vehicles having a relatively light weight are capable of taking on an upright receptacle, in particular bins. After the rear part of the vehicle has been lifted, the tilting frame may be swivelled back until the wheels of the vehicle are in the same plane as the rear end of the bin, such plane being the surface of the roadway in the present case. Subsequently, the actuating elements operating the coulisse are again switched to idle run until the receptacle, in particular the bin has been picked up by the vehicle.

The method of the invention for picking up and depositing receptacles, in particular bins, has the additional advantage that it permits exact placement or positioning of bins or containers having draining or filling openings on a face side on which they are required to stand, which means such containers or bins have to be positioned exactly on the matching openings or outlets in the ground. Such precise set-up is made possible on account of the fact that at its end side, the container can already be engaged or locked in adapters or similar guiding devices before it is placed in its final position. This is made possible through the rolling motion of the vehicle in that during the tilting motion, final adjustments, if required, are automatically effected by such motion.

Of course, the method of the invention, in which actuating elements for a coulisse changing the length of the tilting frame are switched to idle run, may be used also with change gear mechanisms in which the coulisse is replaced by ropes, chains or similar pulling means, which are capable of being engaged on the change container and capable of moving the latter along the tilting frame. However, change gear of the type hereunder discussion is equipped with hydraulics in most cases.

Change gear mechanisms are known in which the coulisse is designed with the shape of an "L", whereby one leg of the "L" is guided moving back and forth in the tilting frame, and the freely projecting leg of the "L" is equipped with a stop element, which is a hook in most cases. Such hook may be engaged in fittings arranged on the face side of change containers to be picked up, in order to pick up and deposit such change containers.

A particularly advantageous embodiment of a change gear mechanism for carrying out the method according to the invention, for which embodiment independent protection is claimed, is characterized in that the coulisse is embodied in the form of a simple sliding frame of which the free end has the stop element. Thus the L-shaped coulisse is missing in such a change mechanism. Consequently such change gear has a significantly lower weight, resulting in a further increase of the payload. With particular benefits, such a change gear mechanism is suitable also for vehicles equipped with a press, into which bulk material such as, for example, household refuse to be collected, can be loaded. The compressed material so collected is then discharged by the press into a receptacle also picked up by the vehicle by means of a change gear. As soon as the receptacle has been filled, it may be deposited with the change gear, and the vehicle can pick up a new, empty change receptacle.

With such vehicles, the press is mounted directly behind the driver's cabin, with the outlet of the press projecting into the receptacle, which is placed directly against the press and supported on the vehicle equipped with the change gear mechanism. With the change gear mechanism according to the invention, in which the coulisse is designed as a single sliding frame by which the tilting frame can be lengthened or shortened, the advantageous method of picking up and depositing receptacles thus is applicable also with vehicles equipped with a compactor or press. Advantageously, the change gear mechanism has a low weight, but it is nevertheless capable of picking up and depositing even heavy receptacles in a safe and trouble-free way as described before.

With the change gear mechanism according to the invention, the actuating element for the coulisse is at least one operating cylinder, for example a double-action operating cylinder. In order to switch the actuating element to idle run, provision is made for an operating arrangement by which such an operating cylinder can be brought into a floating position, which can be accomplished, for example by installing a bypass in the pressure fluid conduits of the operating cylinder for the displacement of the coulisse, such bypass being capable of being operated by means of operating shutoff elements.

Furthermore, the change gear mechanism is characterized in that the stop element has a locking element capable of being actuated. Such locking element permits maintaining the mutual engagement between the stop element of the coulisse and the fitting of the container or receptacle even while the coulisse is being retracted, in order to lift the rear part of the vehicle on a standing receptacle to be picked up.

By way of example, the locking element may be a simple locking bolt capable of being actuated by hand or pneumatically or hydraulically or in some other way, and designed to lock the jaws of a stop element designed in the form of a hook.

Any lateral displacement or shifting of the receptacle has to be avoided particularly during the transport of the receptacle lying on the vehicle.

According to another beneficial feature of the invention, such securing of the receptacle is realized with the change gear mechanism of the invention in that the tilting frame has guide elements disposed within its lateral zone and engaging guide elements on the receptacle.

So as to avoid adjustments of the receptacle and the tilting frame in order to engage the guide elements on the tilting frame and receptacle with one another, which may be troublesome, provision is made that the guide elements on the tilting frame are capable of swinging or folding into and from the engaging position. It is particularly advantageous that each guide element is embodied in the form of a folding roller supported on the tilting frame, such folding roller having a rolling body projecting into a guide rail of the receptacle and being equipped with a radially projecting rim in order to perform lateral guiding functions also on the outside of the guide rail.

BRIEF DESCRIPTION OF THE DRAWINGS

Embodiments of the invention showing additional features of the invention are shown in the drawing, in which.

DETAILED DESCRIPTION OF PREFERRED EMBODIMENTS

Figure 1:
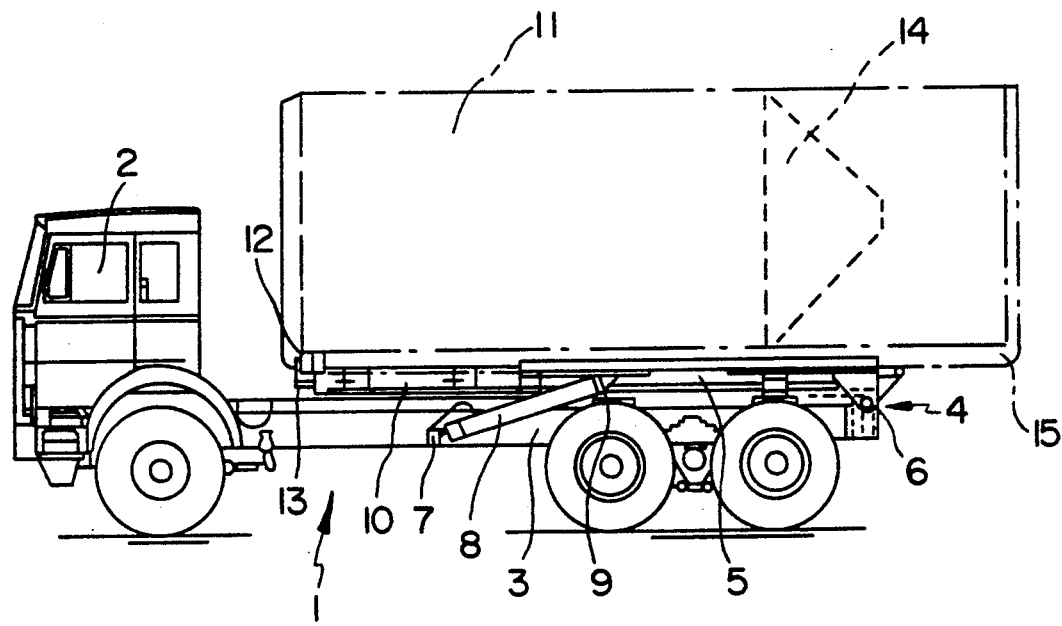
FIGS. 1 to 1d show lateral views of a vehicle with change gear in the various steps of the operation for depositing and picking up a bin.

FIG. 1 shows a vehicle 1 with a driver's cabin 2 and the undercarriage 3. A tilting frame 5 is pivoted on the undercarriage in the back of the vehicle within the zone of the back 4 of the vehicle. The tilting frame is pivotable around the axis 6 indicated in this figure. In the pivot point 7 on the undercarriage, a tilting cylinder 8 is supported, which engages the tilting frame 5 at point 9. When the piston of the tilting cylinder 8 is extended, the tilting frame 5 is pivoted around the axis 6 and driven into predetermined positions of tilt. The free front end of the tilting frame 5 is designed as a guide for a coulisse 10, which, by means of an actuating element—for example an operating cylinder not shown in the drawing—, can be extended from the tilting frame in order to extend such frame, or retracted into the frame in order to shorten the latter.

Figure 1A:
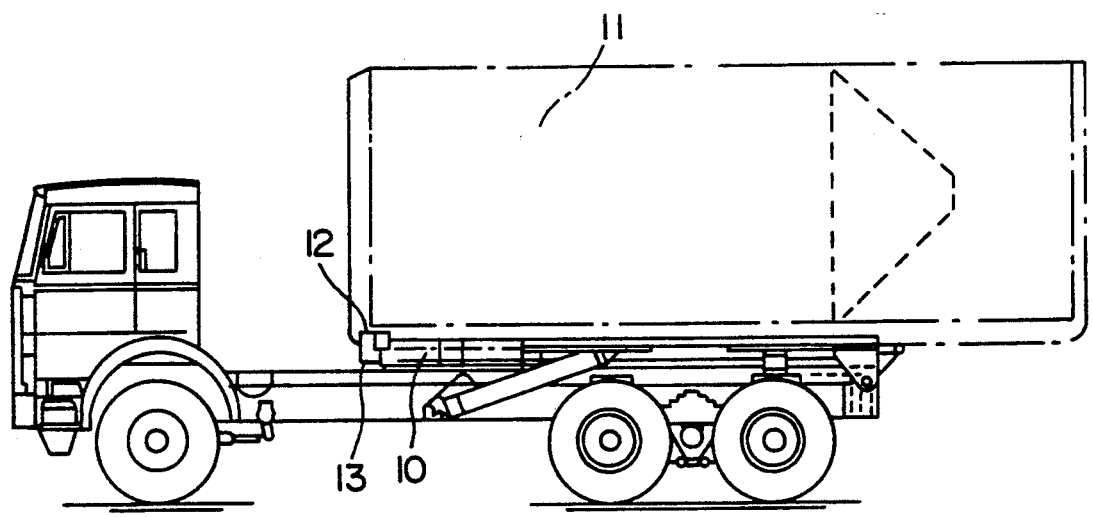

A receptacle 11, which is a bin in the present case, lies or rests on the tilting frame 5 and its coulisse 10. The bin has a fitting 12, by means of which it is engaged in a stop element 13 on the free end of the coulisse 10. When the coulisse is extended or retracted relative to the tilting frame 5, the bin 11 can be pulled on the vehicle towards the driver's cabin 2, or, if the tilting frame is shortened by retraction of the coulisse 10, pushed or displaced rearwardly beyond the back 4 of the vehicle until the supporting legs at the rear end 15 of the bin, which hold the bottom 14—which is fitted with an outlet—of the bin at a certain level above the set-up surface of the bin, project by a predetermined measure beyond the back of the vehicle. Such a position is shown in FIG. 1a. In this position, the total weight of the bin has been shifted in the direction of the rear axle of the vehicle.

Figure 1B:
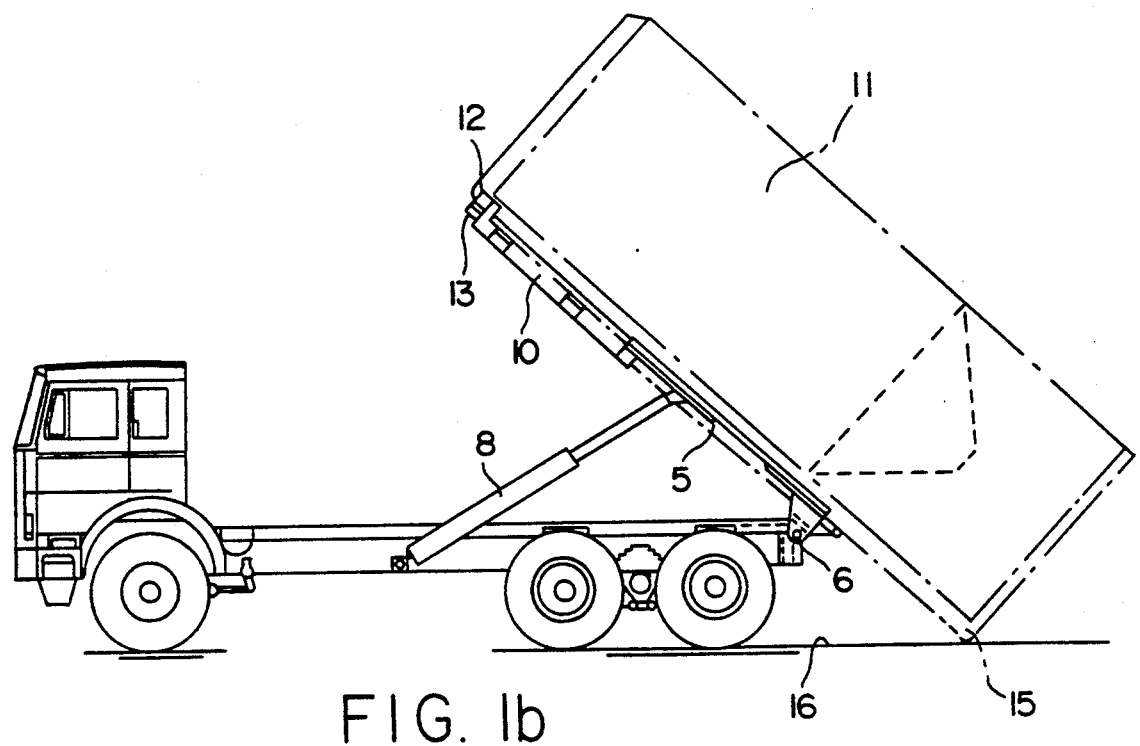

According to FIG. 1b, the tilting cylinder 8 is extended in a next step of the operation, so that the bottom rear end 15 of the bin comes to rest on the ground as shown in the figure, such ground being the roadway surface 16 in the present case. While in this position of tilt of about 45°, the point of gravity of the bin, and thus its total weight, is still disposed approximately above the rear axle of the vehicle, so that the points of support of the slightly tilted bin on the surface of the road and the rear wheels of the vehicle form a multi-point support for the partly tilted bin, which, therefore, is relatively stable and safely supported in this position.

For tilting the tilting frame further until the bin is in its vertical position, the actuating element of the coulisse, which is a double-action working cylinder in the present case, is switched to the idle-run position, which can be accomplished with the cylinder by means of suitable bypasses in the pressure medium feed conduits. The working cylinder moving the coulisse is displaced in this way into a so-called "floating position", which permits the coulisse to move freely while the tilting cylinder 8 is moving the tilting frame and thus also the bin from the 45°-position according to FIG. 1b into the upright or vertical position according to FIG. 1c, in which process of motion the tilting frame and the bin are continuously passing through the various positions of tilt indicated in FIG. 1c. At the same time, the bin swivels around an axis disposed in the plane of the surface of the roadway. The axis 6, around which the tilting frame pivots in relation to the undercarriage, is able to follow such motion if the brakes of the vehicle are released, because as the bin is being erected or set up straight, the vehicle rolls back and approaches the point of support of the bin on the surface of the road.

When a bin is picked up, the above sequence of steps takes place in the reverse order: The vehicle is driven close to the standing bin. Then the tilting frame is driven into a vertical position until it rests against the standing bin and its stop element has engaged the fitting 12 of the bin. This position corresponds with the vertical position of the bin in FIG. 1c.

Figure 1D:
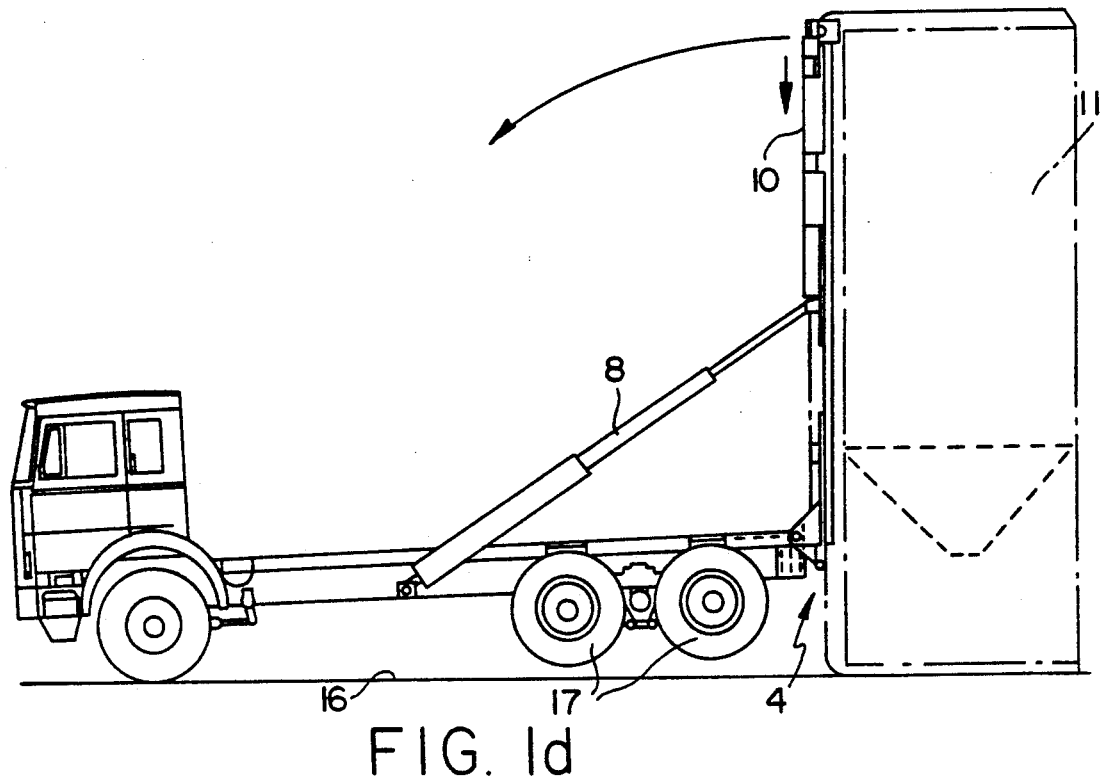
Figure 1C:
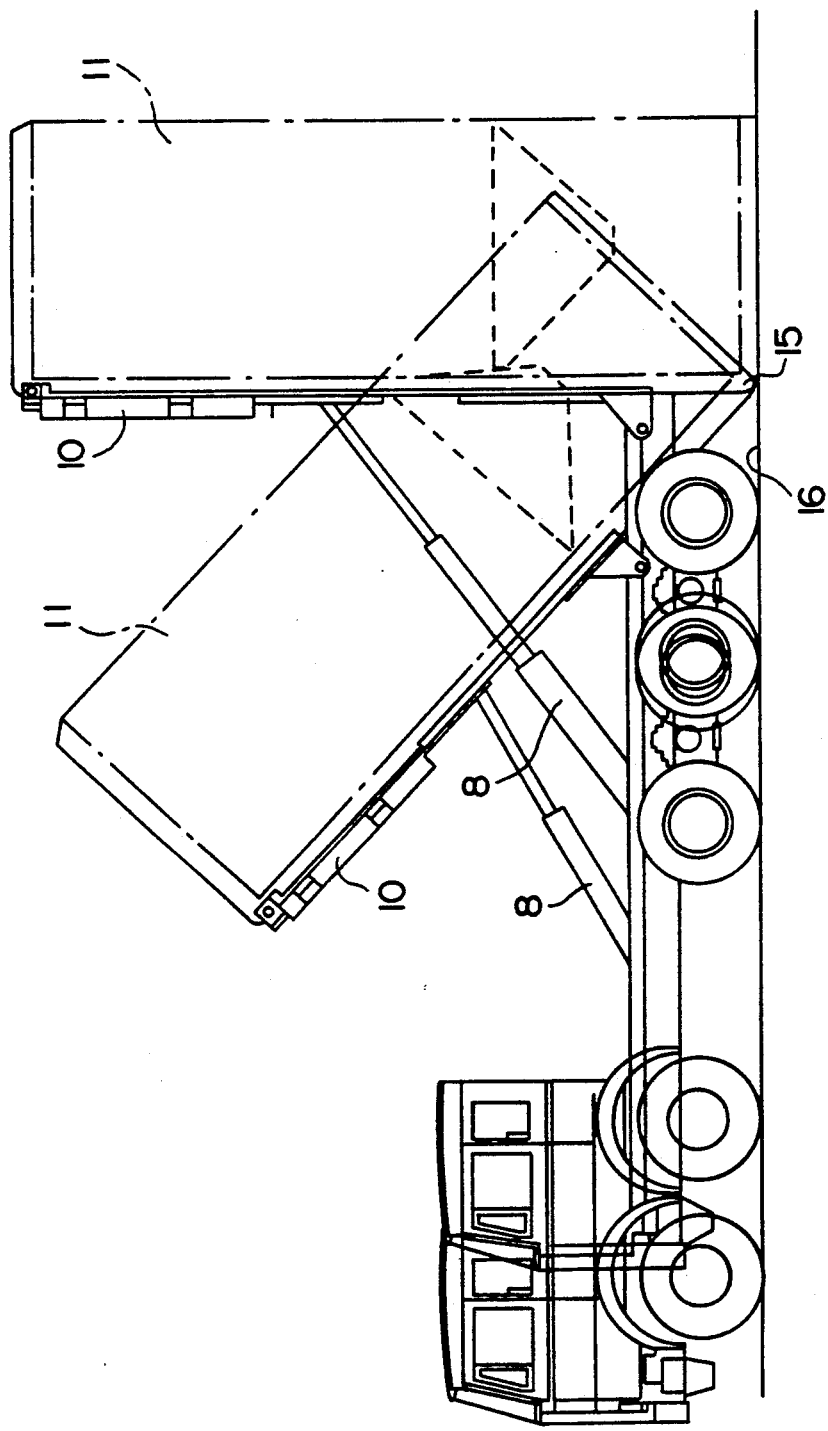

By shortening the vertically extending tilting frame, which, for example, can be accomplished by retracting the coulisse 10 into the tilting frame, the back 4 of the vehicle is lifted on the bin 11 until the wheels 17 of the vehicle have more or less cleared the surface 16 of the roadway as shown in FIG. 1d. In the latter figure, the tilting cylinder 8, which is a multi-stage cylinder in the present case, is extended. For picking up the bin 11, the tilting cylinder is retracted until the rear wheels 17 of the vehicle touch again the ground. During this tilting movement, the weight of the vehicle serves as a counterweight for tilting the bin 11. This permits picking up even filled and, therefore, relatively heavy bins 11 with relatively light vehicles without any problem.

The following phases of the pick-up operation take place in the reversed sequence of the operation described above, until the bin rests again on the vehicle as shown in FIG. 1.

Figure 2:
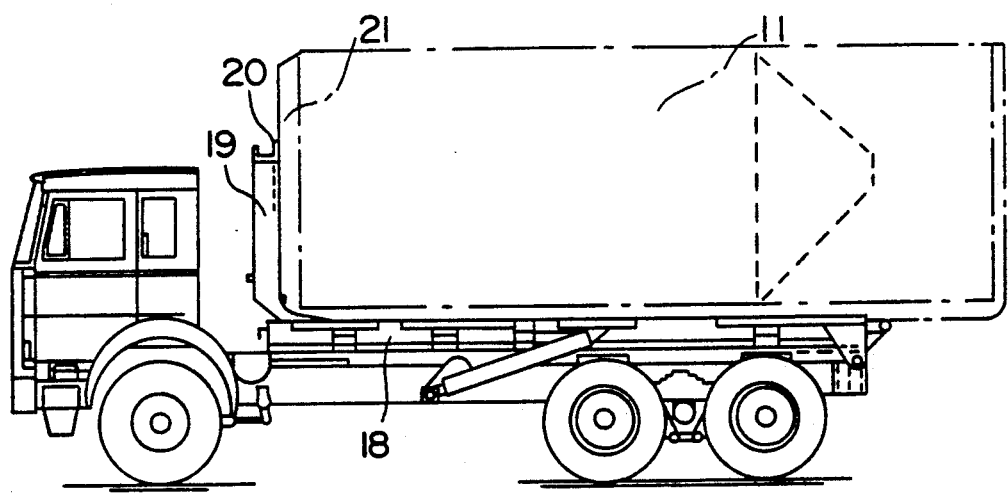
FIG. 2 is a lateral view of a vehicle with a change gear mechanism having an L-shaped coulisse and a picked-up receptacle.
Figure 3:
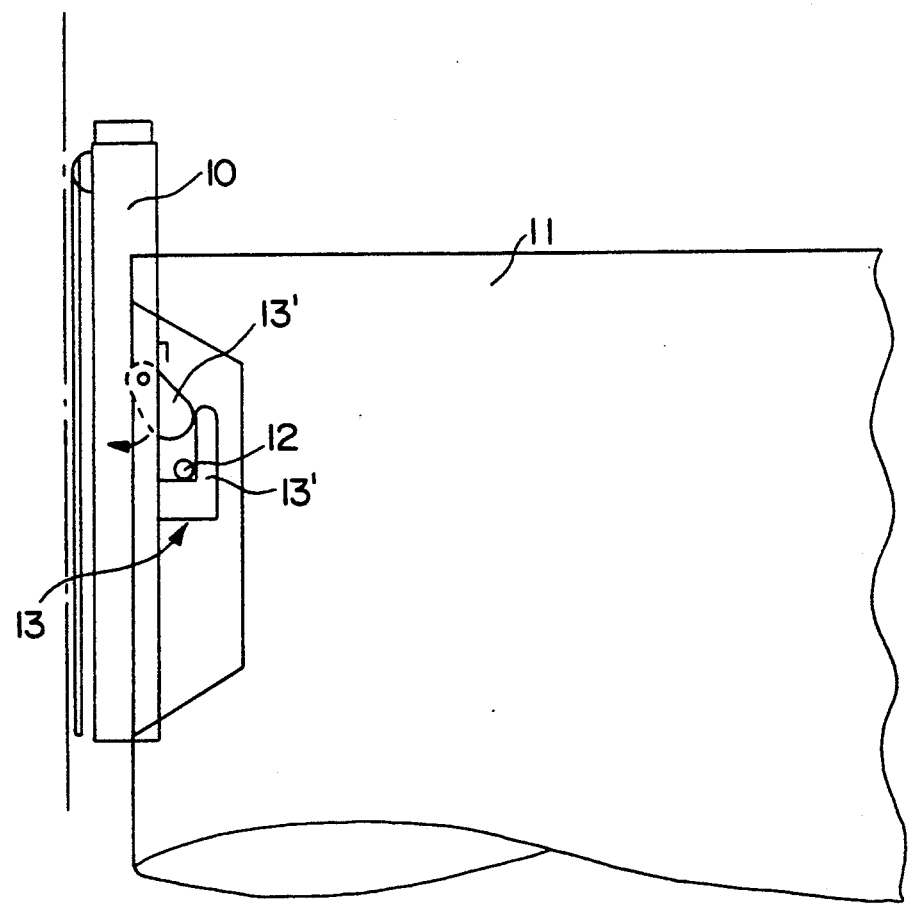
FIG. 3 is a schematic lateral view of the top part of a receptacle locked in the change gear mechanism.

FIG. 2 shows a vehicle with a bin 11 picked up on such vehicle. The change gear mechanism of the vehicle again consists of a tilting frame according to FIG. 1, and a coulisse extending or shortening the tilting frame; however, in the present case, the coulisse is embodied in the form of an L-shaped arm, of which the one leg 18 of the "L"-shaped element is retractably and extendably guided in the tilting frame, whereas the other leg 19 of the L-shaped element, which leg extends approximately vertically relative to the former, has a stop element disposed at its free end, which, in the present case, is a hook 20 adapted to engage a matching fitting on the face side 21 of the bin. For the purpose of reinforcing the support of the bin 11, an additional stop element approximately designed as shown in FIG. 3 may be arranged on the L-leg 18, which additional element is adapted to engage a fitting mounted on the side of the bin. With a change gear of this type, the pick-up and deposit operations can be carried out in the same manner as shown in FIGS. 1 to 1d.

So that the back of the vehicle can be lifted on the bin in the manner specified above, a special embodiment of the stop element 13 engaging the fitting 12 of the bin to be picked up is required. A possible embodiment for a suitable stop element 13 is shown in FIG. 3, which illustrates a schematic lateral view of the top part of a bin 11 engaged in the change gear mechanism. The stop element 13 is comprised of a hook 13' projecting from the coulisse 10 and adapted to seize with the jaws of the hook a fitting 12 embodied in the form of a bolt. A locking element, which can be actuated, is arranged on the coulisse embodied in the form of a pivoting bolt 13" locking the jaws of the hook. This pivoting bolt can be operated electromagnetically, pneumatically or hydraulically.

Figure 4:
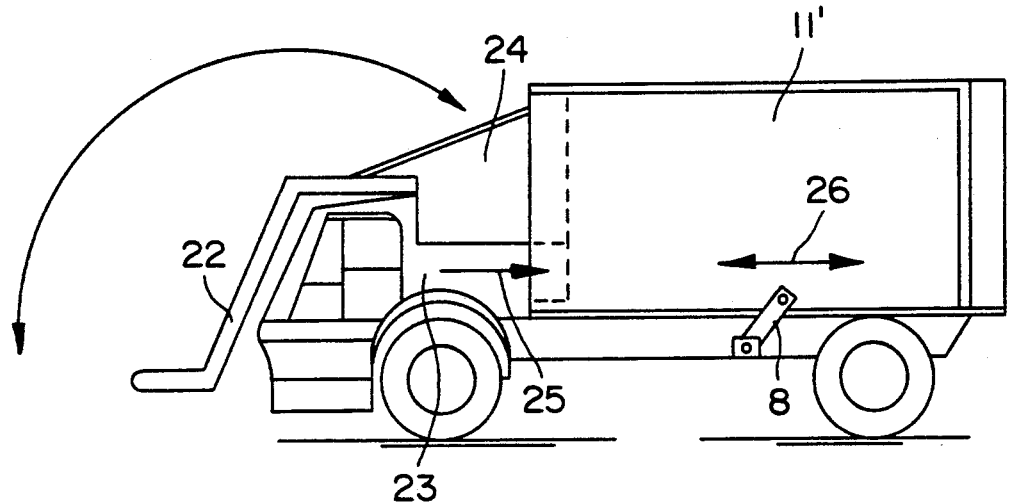
FIG. 4 is a schematic lateral view of a refuse-collecting vehicle with the change receptacle, compactor and loading device.

FIG. 4 shows a schematic lateral view of a vehicle for the collection of, for example household refuse. On its front side, which is equipped with the driver's cabin, the vehicle has a loading device 22, which is known per se. A compactor 23 is mounted behind the driver's cabin, but only indicated in the present figure. The material picked up with the loading device 22 can be charged in the feed shaft 24 of the compactor, which conveys the compacted material in the direction of the arrow 25 into a bin 11' loaded on the vehicle. This bin or receptacle is provided with a matching opening disposed on the face side facing the compactor, through which opening the discharge mouth of the compactor projects into the bin. The vehicle is equipped with a change gear mechanism for picking up and depositing the bin 11'; only the tilting cylinder 8 of such mechanism is indicated in the present figure. The retractable and extendable coulisse of the tilting frame has the advantage that the bin 11, which is still on the vehicle, may be pulled off rearwardly from the mouth of the compactor as soon as it is to be deposited, or an empty bin, which has just been picked up, can be displaced forwardly against the compactor as shown by the double arrow 26.

Figure 5:
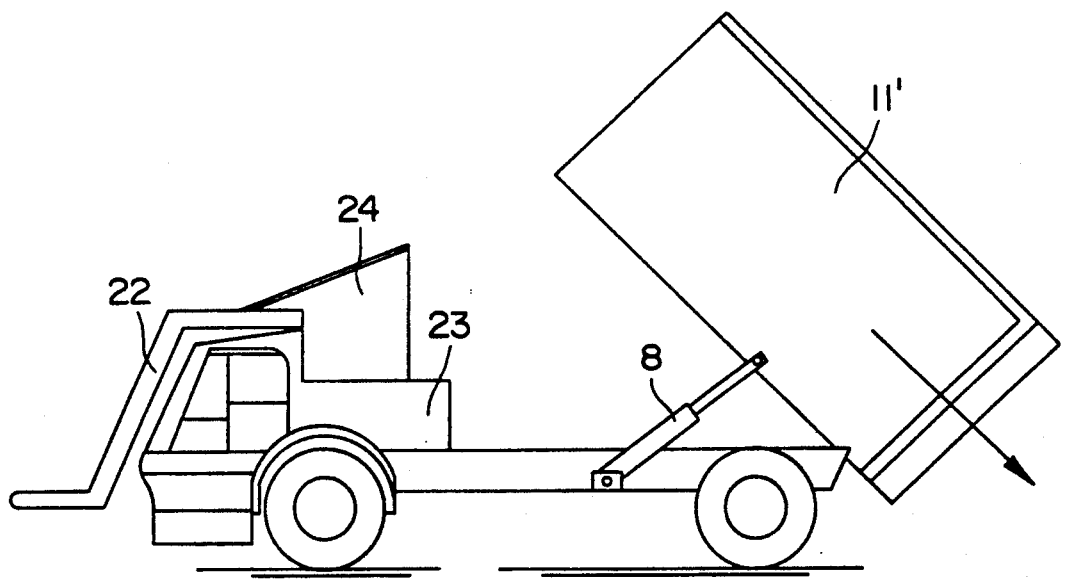
FIG. 5 shows the vehicle according to FIG. 4 in the process of depositing the receptacle with the change gear mechanism according to the invention.
Figure 6:
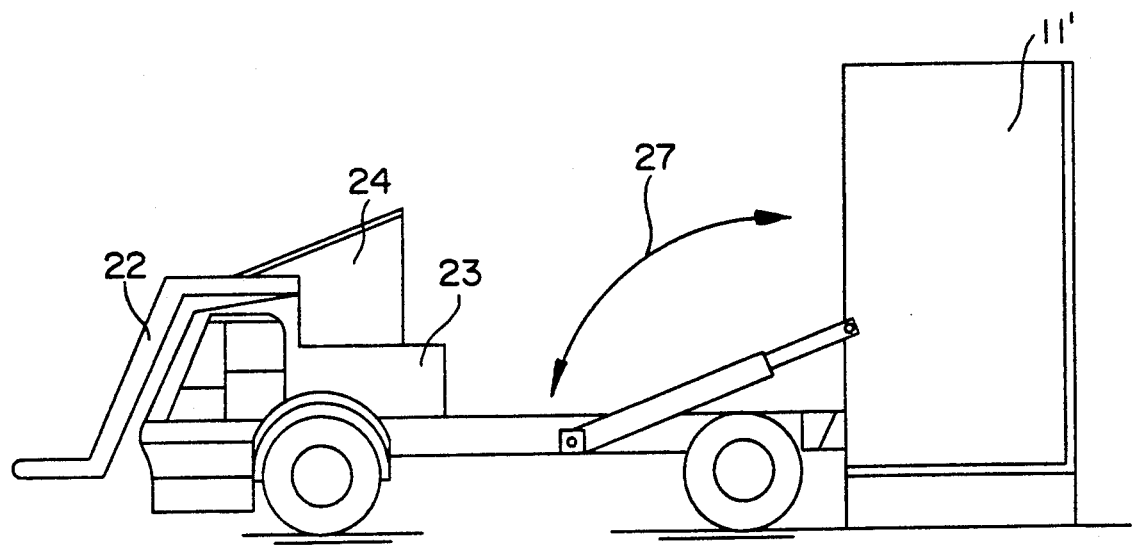
FIG. 6 shows the vehicle according to FIG. 4 with the receptacle deposited behind the vehicle.

For depositing the bin, the tilting cylinder 8 is extended (FIG. 5), and the depositing operation takes place as described above. The filled bin can be deposited standing on a face side, and stored in that position until further transport, in the manner shown in FIG. 6. Of course, standing containers can be picked up as well, in which case the pivoting motion of the tilting frame is reversed. The pick-up and depositing operations are indicated in FIG. 6 by the double arrow 27.

Figure 7:
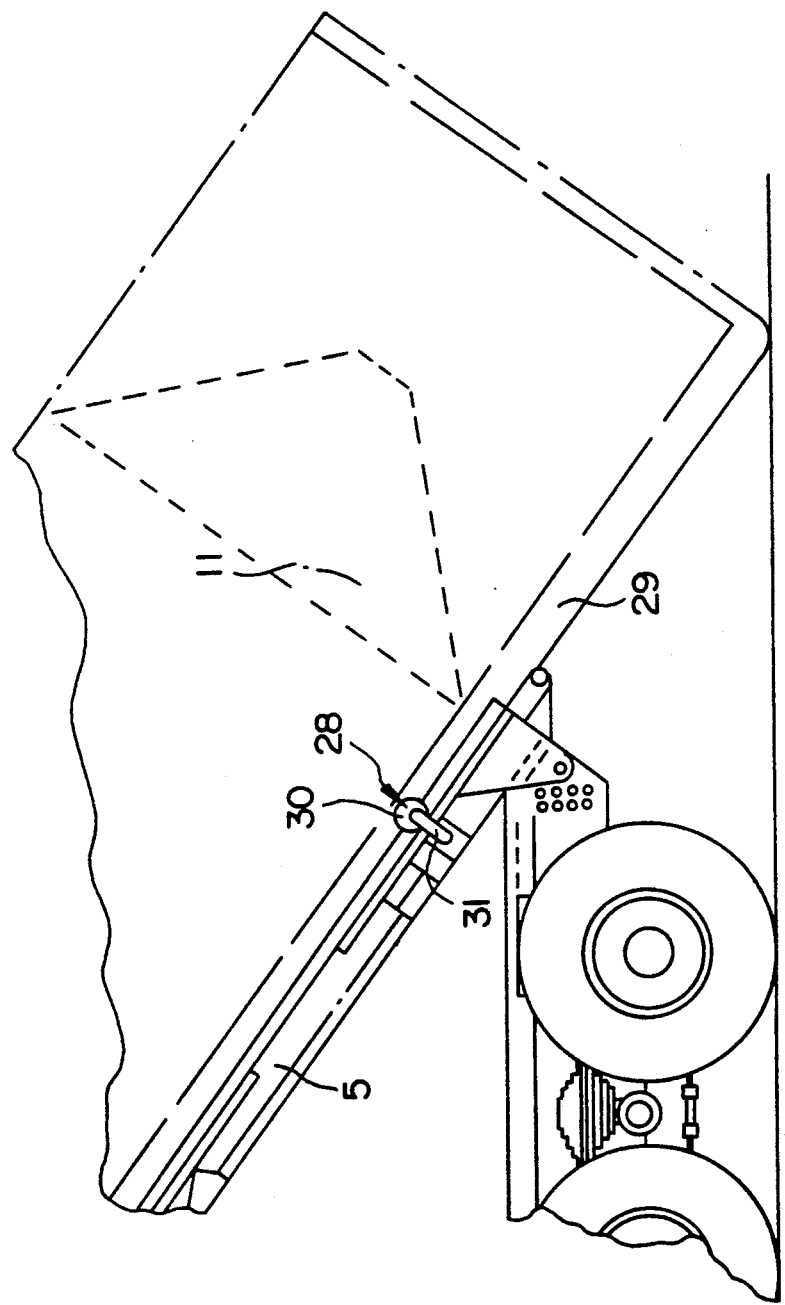
FIG. 7 is a partial view of the back of the vehicle with the tilting frame in the pick-up position, the receptacle and guide elements arranged foldably on the tilting frame.

FIG. 7 shows a schematic lateral view of the back of the vehicle. In the present case, a bin-type container 11, which is indicated only in the fixture, rests on the tilted frame 5. On its side facing the tilting frame, this bin 11 is equipped with the guide elements 29, of which each element is a profiled rail, for example a U- or I-profile, which is arranged on the bin in a way such that the bin rests on the tilting frame with two parallel profiled rails.

The guide elements 28 engaging the guide elements 29 are arranged on the tilting frame. Each guide element 28 comprises a folding roller 30 supported on the free end of a folding lever 31. The latter is pivoted on the tilting frame 5. The foldability of the folding roller permits selectively engaging or disengaging the guide means 28 with or from the guide elements 29 of the bin 11.

Figure 8:
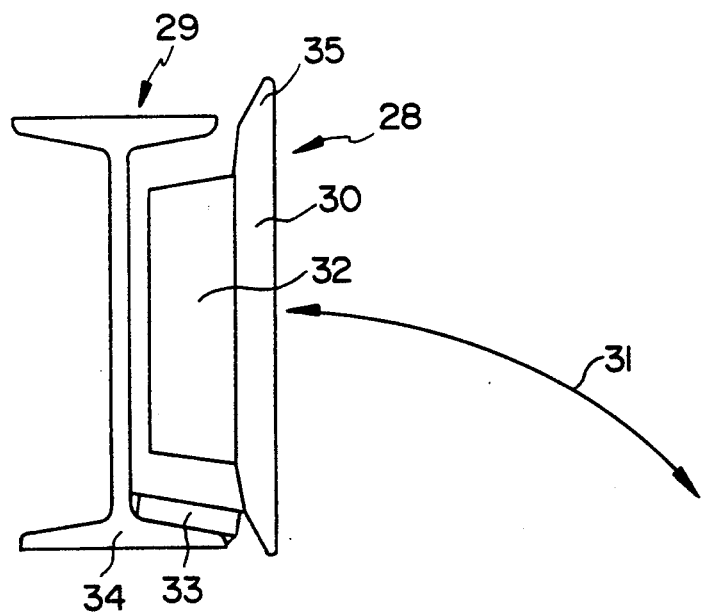
FIG. 8 shows an enlarged schematic sectional view of the guide element according to FIG. 7.

FIG. 8 shows a sectional view of a guide element, which is an I-profile in the present case, which is engaged by a guide means 28 embodied in the form of a folding roller 30. The foldability is indicated by the double arrow 31. FIG. 8 shows that each folding roller 30 consists of a rolling body 32 capable of engaging between the T-flanges of the I-profile and rolling off on a reinforcing rail 33 of the bottom T-flange 34. Each rolling body has a projecting rim 35 for the purpose of lateral guidance.

Figure 9:
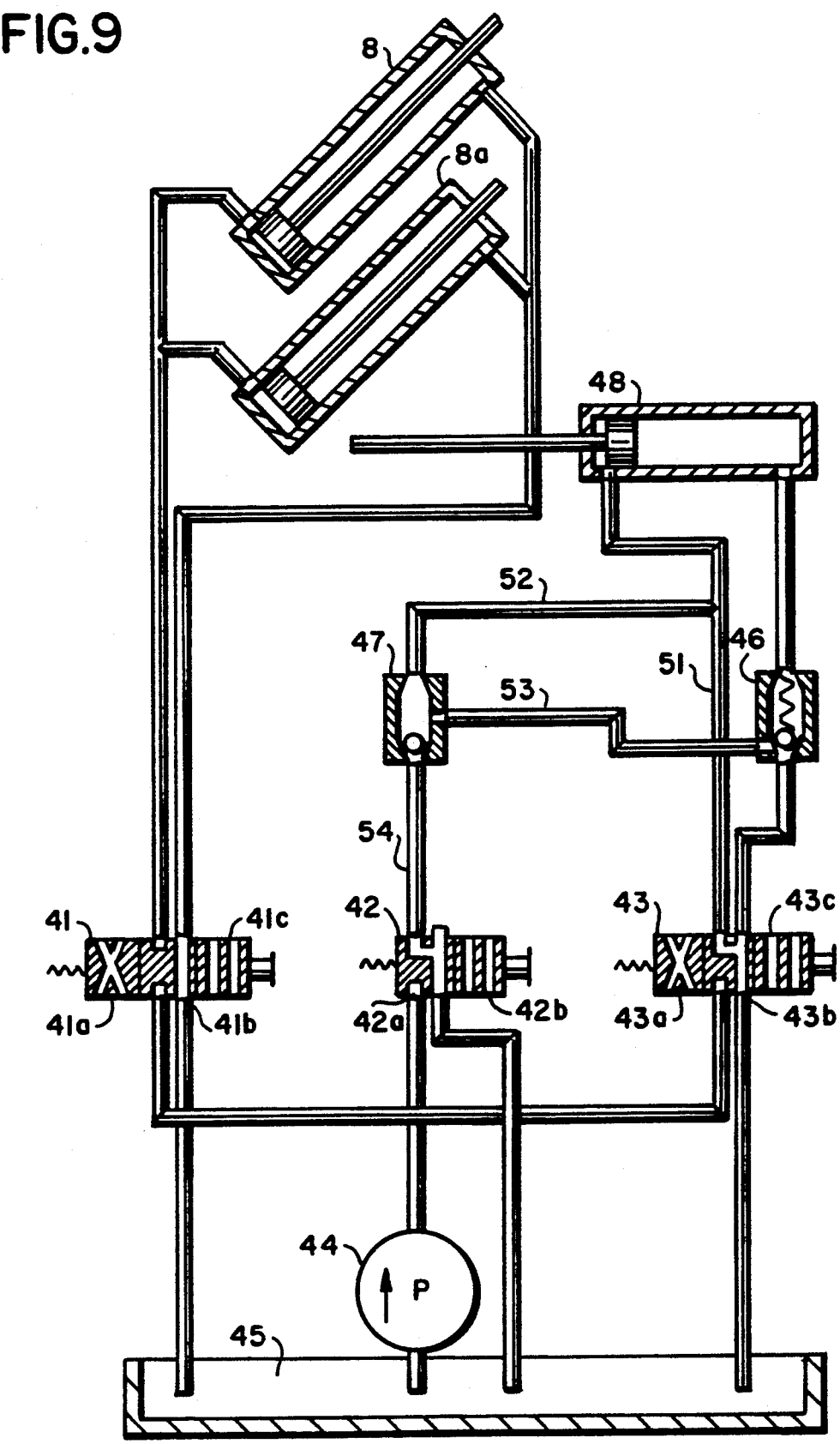
FIG. 9 shows the fluid system for operating the floating switch.

The two piston cylinders numbered 8 and 8a in FIG. 9 correspond to the working cylinders numbered 8 in FIG. 1b of the present patent application. Cylinder 48 of FIG. 9 serves to move the coulisse 10 which is shown in the drawing, for example in FIG. 1b.

The function of the floating switch is discussed in connection with FIG. 9, wherein means 41 is a directional control valve with manual operation; means 42 is a directional control valve with manual operation; means 43 is a directional control valve with manual operation; means 44 is a fluid power motor; means 45 is a storage chamber; means 46 is a check valve; means 47 is a OR-valve; means 48 is a sliding cylinder on the device for setting the container upright; and means 8 and means 8a are a pair of tilting cylinders for the swinging of the tilting frame 5.

For garbage collection vehicles the process of picking up and setting down a container is facilitated by the fact that the container is initially located over the rear of the vehicle on the tilting frame by a pre-determined amount. The tilting frame is subsequently tilted through the operation of a first pressure medium piston cylinder unit until the lower area of the back end of the container rests on the roadway surface or on the ground. The second pressure medium piston cylinder unit moving the container on the auxiliary frame is then switched to the floating position so that the tilting frame can be tilted to a vertical position without alternating operation of the first and second pressure medium piston cylinder units after which it then stands upright on its bottom end. During the tilting into the vertical position, the second pressure medium piston cylinder unit can be extended and retracted in the required manner.

In order to vertically set down a container from its initial horizontal position on a garbage collection vehicle reference is made to the fluid flow circuitry diagram of FIG. 9. Here the pressure medium piston cylinder unit 48 is initially retracted through the operation of the valve 43, switching position 43c. The retracting piston rod moves the container backwards by means of a hook and eyelet on the horizontal tilting frame towards the rear of the vehicle. Through the pressure lines 51 and 52 and also through the OR-valve 47 and the line 53 the pressure medium reaches the check valve 46. It is unlocked through the built up pressure and thereby enables the expelled pressure medium to flow back into the storage chamber 45 from the piston side of the pressure medium piston cylinder unit 48. With the help of check valve 46, a controllable rate for the setting down of the container is provided. Should the container slide during the process of swinging the tilting frame, this sliding could be avoided by switching valve 42 back to position 42a.

When the container reaches its final position in which the rear end of the container sticks out over the rear of the vehicle, valve 43 is switched back to its position 43b. Through operation of valve 41, namely position 41c the pressure medium piston cylinder units 8 and 8a extend and swing the tilting frame with the container. When the rear container edge touches the roadway surface, valve 41 is switched back to its position 41b.

Subsequently, valve 42 is switched to position 42b which adds pressure to check valve 46 through line 54, the OR-valve 47, and line 53. Now the pressure medium piston cylinder unit 48 is switched to the floating position so that the pressure medium can be expelled by the piston on the piston side or on the piston rod side.

Now the process of setting the container upright can continue by switching valve 41 to position 41c and further extension of the pressure medium piston cylinder units. Through the floating switch the container can slowly glide upwardly during the swinging of the tilting frame so that a faulty grip between the container and the tilting frame is avoided.

Picking up a vertical container occurs in such a manner that initially the tilting frame is moved to a vertical position and by extending the second pressure medium piston cylinder unit 48 is order to allow the hook connected hereto to move into the container eyelet. Following this the hook and container eyelet are locked; and valve 42 is switched to position 42b. In this manner it is possible that because of the floating switch the container can slide downwards on the tilting frame on the container edge standing on the ground when retracting the pressure medium piston cylinder units 8 and 8a in order to thus prevent faulty gripping. If the container edge is lifted off the ground, the floating switch is cancelled through setting valve 42 to position 42a. The tilting frame is completely swung down through retraction of the pressure medium piston cylinder units 8 and 8a. Following this, the container is pushed to its final position on the vehicle through extension of the pressure medium piston cylinder unit 48.

I claim:

1. Method of picking up from a roadway surface and depositing a hollow receptacle having an associated fitting and having a rear end with a bottom zone on a vehicle having a back and having an undercarriage and having brakes and equipped with a change gear mechanism having a tilting frame pivoted in the back on the undercarriage of the vehicle and movable by means of a tilting cylinder supported on the undercarriage, and furthermore having a coulisse displaceable on the tilting frame by means of associated actuating elements and equipped with a stop element capable of being engaged with the associated fitting on the receptacle, comprising
   retracting the coulisse until the rear end of the receptacle projects beyond the back of the vehicle by a predetermined measure for depositing the receptacle;
   slightly tilting the tilting frame until the bottom zone of the rear end of the receptacle rests on the surface of the roadway;
   switching the actuating elements of the coulisse to idle run;
   releasing the brakes of the vehicle;
   tilting the tilting frame further until the receptacle is placed upright on its rear end; and
   disengaging the stop element from the fittings on the receptacle.

2. Method as defined in claim 1, comprising
   extending the coulisse to an extent such that the receptacle, with its rear end, touches the surface of the roadway at an angle of tile of the tilting frame of approximately 45°.

3. Method as defined in claim 1, comprising engaging the stop element in the fitting of the receptacle for picking up a standing receptacle; and
   lifting the back of the vehicle by a predetermined measure on the standing receptacle.

4. Method as defined in claim 3, comprising reducing the length of the tilting frame to lift the back of the vehicle.

5. Method as defined in claim 4, comprising retracting the coulisse to shorten the tilting frame.

6. Change gear mechanism for picking up and depositing a hollow receptacle on a vehicle having said change gear mechanism comprising
   a tilting frame pivoted in a back on an undercarriage of the vehicle;
   a tilting cylinder for moving said tilting frame and supported on the undercarriage;
   a coulisse on said tilting frame; said coulisse being displaceable on the tilting frame by an associated actuating element and equipped with a stop element capable of being engaged with an associated fitting on the receptacle;
   said actuating element for the coulisse having at least one operating cylinder having a floating position, and said operating cylinder capable of being shifted into the floating position by an operable arrangement;
   said operable arrangement comprising a pressure medium feed conduit associated with the operating cylinder, said feed conduit having a bypass; and
   a shutoff element capable of being actuated in order to put said bypass into service.

7. Change gear mechanism as defined in claim 6, wherein said coulisse comprises a single sliding frame having a stop element at its free end.

8. Change gear mechanism as defined in claim 7, wherein said stop element has a locking element capable of being actuated.

9. Change gear mechanism as defined in claim 8, wherein said stop element comprises a hook having jaws; and
   said locking element comprises a pivoting bolt locking the jaws of the hook.

10. Change gear mechanism as defined in claim 6, wherein the tilting frame has a lateral zone, and said tilting frame has in said lateral zone guide means engaging in guide elements on the receptacle.

11. Change gear mechanism as defined in claim 10, wherein said guide means on the tilting frame are supported foldable into and from the engaging position.

12. Change gear mechanism as defined in claim 11, wherein each guide means comprises a folding roller supported on the tilting frame.

13. A change gear mechanism as defined in claim 6, comprising said fitting being in a surface zone capable of being contacted with the tilting frame and its coulisse.

* * * * *